United States Patent
Rosenstein (10) Patent No.: US 7,861,087 B2
(45) Date of Patent: Dec. 28, 2010

(54) SYSTEMS AND METHODS FOR STATE SIGNING OF INTERNET RESOURCES

(75) Inventor: Adam H. Rosenstein, Petaluma, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 560 days.

(21) Appl. No.: 11/832,434

(22) Filed: Aug. 1, 2007

(65) Prior Publication Data

US 2007/0271599 A1 Nov. 22, 2007

Related U.S. Application Data

(63) Continuation of application No. 10/857,536, filed on May 28, 2004, now abandoned.

(60) Provisional application No. 60/473,931, filed on May 28, 2003.

(51) Int. Cl.
*H04L 29/00* (2006.01)

(52) U.S. Cl. ........................... 713/176; 713/153; 726/12

(58) Field of Classification Search ........................ None
See application file for complete search history.

(56) References Cited

U.S. PATENT DOCUMENTS

| | | | |
|---|---|---|---|
| 5,708,780 A | 1/1998 | Levergood et al. | |
| 5,758,085 A | 5/1998 | Kouoheris et al. | |
| 5,862,325 A | 1/1999 | Reed et al. | |
| 5,867,494 A | 2/1999 | Krishnaswamy et al. | |
| 5,999,525 A | 12/1999 | Krishnaswamy et al. | |
| 6,006,242 A | 12/1999 | Poole et al. | |
| 6,226,618 B1 | 5/2001 | Downs et al. | |
| 6,256,773 B1 | 7/2001 | Bowman-Amuah | |
| 6,263,363 B1 | 7/2001 | Rosenblatt et al. | |
| 6,289,382 B1 | 9/2001 | Bowman-Amuah | |
| 6,324,647 B1 | 11/2001 | Bowman-Amuah | |
| 6,332,163 B1 | 12/2001 | Bowman-Amuah | |
| 6,335,927 B1 | 1/2002 | Elliott et al. | |
| 6,339,832 B1 | 1/2002 | Bowman-Amuah | |
| 6,370,573 B1 | 4/2002 | Bowman-Amuah | |
| 6,400,996 B1 | 6/2002 | Hoffberg et al. | |
| 6,405,364 B1 | 6/2002 | Bowman-Amuah | |
| 6,434,568 B1 | 8/2002 | Bowman-Amuah | |
| 6,434,628 B1 | 8/2002 | Bowman-Amuah | |
| 6,438,594 B1 | 8/2002 | Bowman-Amuah | |

(Continued)

OTHER PUBLICATIONS

PKCS #7: Cryptographic Message Syntax Standard, RSA Laboratories, Nov. 1993.*

(Continued)

*Primary Examiner*—Minh Dinh
(74) *Attorney, Agent, or Firm*—Christopher McKenna; Foley and Lardner LLP (57) ABSTRACT

A method, system, and software for state signing of Internet resources is presented in which web pages and other Internet resources are signed after the insertion of metadata indicating intended and authorized uses. In one embodiment, the signing is accomplished through use of a cryptographic signature added to any data item passed to a client that is likely to be passed back to the server later, such as a cookie, URL, or data integrity item. Enabling and disabling of state signing for various data items can be controlled through policies tied to URL prefixes.

20 Claims, 6 Drawing Sheets

U.S. PATENT DOCUMENTS

| | | |
|---|---|---|
| 6,442,748 B1 | 8/2002 | Bowman-Amuah |
| 6,473,794 B1 | 10/2002 | Guheen et al. |
| 6,477,580 B1 | 11/2002 | Bowman-Amuah |
| 6,477,665 B1 | 11/2002 | Bowman-Amuah |
| 6,496,850 B1 | 12/2002 | Bowman-Amuah |
| 6,502,102 B1 | 12/2002 | Haswell et al. |
| 6,502,213 B1 | 12/2002 | Bowman-Amuah |
| 6,514,085 B2 | 2/2003 | Slattery et al. |
| 6,515,968 B1 | 2/2003 | Combar et al. |
| 6,519,571 B1 | 2/2003 | Guheen et al. |
| 6,523,027 B1 | 2/2003 | Underwood |
| 6,529,909 B1 | 3/2003 | Bowman-Amuah |
| 6,529,948 B1 | 3/2003 | Bowman-Amuah |
| 6,536,037 B1 | 3/2003 | Guheen et al. |
| 6,539,396 B1 | 3/2003 | Bowman-Amuah |
| 6,549,949 B1 | 4/2003 | Bowman-Amuah |
| 6,550,057 B1 | 4/2003 | Bowman-Amuah |
| 6,571,282 B1 | 5/2003 | Bowman-Amuah |
| 6,578,068 B1 | 6/2003 | Bowman-Amuah |
| 6,584,569 B2 | 6/2003 | Reshef et al. |
| 6,601,192 B1 | 7/2003 | Bowman-Amuah |
| 6,601,233 B1 | 7/2003 | Underwood |
| 6,601,234 B1 | 7/2003 | Bowman-Amuah |
| 6,606,660 B1 | 8/2003 | Bowman-Amuah |
| 6,606,744 B1 | 8/2003 | Mikurak |
| 6,609,128 B1 | 8/2003 | Underwood |
| 6,615,166 B1 | 9/2003 | Guheen et al. |
| 6,615,199 B1 | 9/2003 | Bowman-Amuah |
| 6,615,253 B1 | 9/2003 | Bowman-Amuah |
| 6,629,081 B1 | 9/2003 | Cornelius et al. |
| 6,633,878 B1 | 10/2003 | Underwood |
| 6,636,242 B2 | 10/2003 | Bowman-Amuah |
| 6,640,145 B2 | 10/2003 | Hoffberg et al. |
| 6,640,238 B1 | 10/2003 | Bowman-Amuah |
| 6,640,240 B1 | 10/2003 | Hoffman et al. |
| 6,640,244 B1 | 10/2003 | Bowman-Amuah |
| 6,640,249 B1 | 10/2003 | Bowman-Amuah |
| 6,643,652 B2 | 11/2003 | Helgeson et al. |
| 6,662,357 B1 | 12/2003 | Bowman-Amuah |
| 6,671,818 B1 | 12/2003 | Mikurak |
| 6,701,345 B1 | 3/2004 | Carley et al. |
| 6,701,514 B1 | 3/2004 | Haswell et al. |
| 6,704,873 B1 | 3/2004 | Underwood |
| 6,715,145 B1 | 3/2004 | Bowman-Amuah |
| 6,718,535 B1 | 4/2004 | Underwood |
| 6,721,713 B1 | 4/2004 | Guheen et al. |
| 6,721,747 B2 | 4/2004 | Lipkin |
| 6,725,425 B1 | 4/2004 | Rajan et al. |
| 6,728,000 B1 | 4/2004 | Lapstun et al. |
| 6,731,625 B1 | 5/2004 | Eastep et al. |
| 6,742,015 B1 | 5/2004 | Bowman-Amuah |
| 6,754,181 B1 | 6/2004 | Elliott et al. |
| 6,766,944 B2 | 7/2004 | Silverbrook et al. |
| 6,795,089 B2 | 9/2004 | Rajarajan et al. |
| 6,795,593 B2 | 9/2004 | Silverbrook et al. |
| 6,839,053 B2 | 1/2005 | Lapstun et al. |
| 6,842,906 B1 | 1/2005 | Bowman-Amuah |
| 6,850,252 B1 | 2/2005 | Hoffberg |
| 6,850,893 B2 | 2/2005 | Lipkin et al. |
| 6,859,212 B2 | 2/2005 | Kumar et al. |
| 6,862,105 B2 | 3/2005 | Silverbrook et al. |
| 6,891,953 B1 | 5/2005 | DeMello et al. |
| 6,895,084 B1 | 5/2005 | Saylor et al. |
| 6,904,449 B1 | 6/2005 | Quinones |
| 6,907,546 B1 | 6/2005 | Haswell et al. |
| 6,909,708 B1 | 6/2005 | Krishnaswamy et al. |
| 6,914,593 B2 | 7/2005 | Lapstun et al. |
| 6,954,736 B2 | 10/2005 | Menninger et al. |
| 6,957,186 B1 | 10/2005 | Guheen et al. |
| 6,970,849 B1 | 11/2005 | DeMello et al. |
| 6,976,090 B2 | 12/2005 | Ben-Shaul et al. |
| 6,982,807 B2 | 1/2006 | Lapstun et al. |
| 6,989,911 B2 | 1/2006 | Lapstun et al. |
| 6,990,453 B2 | 1/2006 | Wang et al. |
| 7,006,881 B1 | 2/2006 | Hoffberg et al. |
| 7,010,147 B2 | 3/2006 | Silverbrook et al. |
| 7,013,290 B2 | 3/2006 | Ananian et al. |
| 7,023,979 B1 | 4/2006 | Wu et al. |
| 7,031,010 B2 | 4/2006 | Lapstun et al. |
| 7,039,606 B2 | 5/2006 | Hoffman et al. |
| 7,041,916 B2 | 5/2006 | Paul et al. |
| 7,043,716 B2 | 5/2006 | Zimmer et al. |
| 7,047,411 B1 | 5/2006 | DeMello et al. |
| 7,054,367 B2 | 5/2006 | Oguz et al. |
| 7,054,837 B2 | 5/2006 | Hoffman et al. |
| 7,069,234 B1 | 6/2006 | Cornelius et al. |
| 7,072,843 B2 | 7/2006 | Menninger et al. |
| 7,072,934 B2 | 7/2006 | Helgeson et al. |
| 7,076,736 B2 | 7/2006 | Hugh |
| 7,085,850 B2 * | 8/2006 | Calvignac et al. ............ 709/246 |
| 7,089,583 B2 | 8/2006 | Mehra et al. |
| 7,100,195 B1 | 8/2006 | Underwood |
| 7,102,772 B1 | 9/2006 | Lapstun et al. |
| 7,107,285 B2 | 9/2006 | von Kaenel et al. |
| 7,113,934 B2 | 9/2006 | Levesque et al. |
| 7,117,504 B2 | 10/2006 | Smith et al. |
| 7,118,025 B2 | 10/2006 | Silverbrook et al. |
| 7,120,596 B2 | 10/2006 | Hoffman et al. |
| 7,123,239 B1 | 10/2006 | Lapstun et al. |
| 7,124,101 B1 | 10/2006 | Mikurak |
| 7,130,807 B1 | 10/2006 | Mikurak |
| 7,130,812 B1 | 10/2006 | Iyer et al. |
| 7,134,601 B2 | 11/2006 | Silverbrook et al. |
| 7,139,999 B2 | 11/2006 | Bowman-Amuah |
| 7,143,089 B2 | 11/2006 | Petras et al. |
| 7,145,898 B1 | 12/2006 | Elliott |
| 7,149,698 B2 | 12/2006 | Guheen et al. |
| 7,158,953 B1 | 1/2007 | DeMello et al. |
| 7,165,041 B1 | 1/2007 | Guheen et al. |
| 7,167,844 B1 | 1/2007 | Leong et al. |
| 7,171,379 B2 | 1/2007 | Menninger et al. |
| 7,185,075 B1 | 2/2007 | Mishra et al. |
| 7,196,712 B2 | 3/2007 | Rajarajan et al. |
| 7,200,804 B1 | 4/2007 | Khavari et al. |
| 7,206,805 B1 | 4/2007 | McLaughlin, Jr. |
| 7,218,779 B2 | 5/2007 | Dodge et al. |
| 7,225,040 B2 | 5/2007 | Eller et al. |
| 7,225,244 B2 | 5/2007 | Reynolds et al. |
| 7,227,527 B2 | 6/2007 | Lapstun et al. |
| 7,240,150 B1 | 7/2007 | Todd et al. |
| 7,484,208 B1 | 1/2009 | Nelson |
| 2001/0032207 A1 | 10/2001 | Hartley et al. |
| 2002/0032798 A1 | 3/2002 | Xu |
| 2002/0033844 A1 | 3/2002 | Levy et al. |
| 2002/0049608 A1 | 4/2002 | Hartsell et al. |
| 2002/0049788 A1 | 4/2002 | Lipkin et al. |
| 2002/0049841 A1 | 4/2002 | Johnson et al. |
| 2002/0049900 A1 | 4/2002 | Patrick |
| 2002/0059274 A1 | 5/2002 | Hartsell et al. |
| 2002/0065864 A1 | 5/2002 | Hartsell et al. |
| 2002/0099738 A1 | 7/2002 | Grant |
| 2002/0116582 A1 | 8/2002 | Copeland et al. |
| 2002/0161801 A1 | 10/2002 | Hind et al. |
| 2002/0174227 A1 | 11/2002 | Hartsell et al. |
| 2002/0188890 A1 | 12/2002 | Shupps et al. |
| 2003/0041167 A1 | 2/2003 | French et al. |
| 2003/0051142 A1 * | 3/2003 | Hidalgo et al. .............. 713/176 |
| 2003/0055883 A1 | 3/2003 | Wiles |
| 2003/0105977 A1 | 6/2003 | Brabson et al. |
| 2003/0182431 A1 | 9/2003 | Sturniolo et al. |
| 2003/0191812 A1 | 10/2003 | Agarwalla et al. |
| 2003/0233544 A1 | 12/2003 | Erlingsson |
| 2004/0031058 A1 | 2/2004 | Reisman |
| 2004/0049549 A1 | 3/2004 | Slattery et al. |

| | | |
|---|---|---|
| 2004/0073512 A1 | 4/2004 | Maung |
| 2004/0073630 A1 | 4/2004 | Copeland et al. |
| 2004/0103147 A1 | 5/2004 | Flesher et al. |
| 2004/0111639 A1 | 6/2004 | Schwartz et al. |
| 2004/0210320 A1 | 10/2004 | Pandya |
| 2004/0268357 A1 | 12/2004 | Joy et al. |
| 2004/0268358 A1 | 12/2004 | Darling et al. |
| 2005/0044089 A1 | 2/2005 | Wu et al. |
| 2005/0044108 A1 | 2/2005 | Shah et al. |
| 2005/0050053 A1 | 3/2005 | Thompson |
| 2005/0063083 A1 | 3/2005 | Dart et al. |
| 2005/0086206 A1 | 4/2005 | Balasubramanian et al. |
| 2005/0154699 A1 | 7/2005 | Lipkin et al. |
| 2005/0192921 A1 | 9/2005 | Chaudhuri et al. |
| 2005/0210263 A1 | 9/2005 | Levas et al. |
| 2005/0262063 A1 | 11/2005 | Conboy et al. |
| 2006/0041635 A1 | 2/2006 | Alexander et al. |
| 2006/0047974 A1 | 3/2006 | Alpern et al. |
| 2006/0092861 A1 | 5/2006 | Corday et al. |
| 2006/0123467 A1 | 6/2006 | Kumar et al. |
| 2006/0129689 A1 | 6/2006 | Ho et al. |
| 2006/0161671 A1 | 7/2006 | Ryman et al. |
| 2006/0161959 A1 | 7/2006 | Ryman et al. |
| 2007/0179955 A1 | 8/2007 | Croft et al. |
| 2007/0245409 A1 | 10/2007 | Harris et al. |
| 2009/0125904 A1 | 5/2009 | Nelson |
| 2009/0133015 A1 | 5/2009 | Nagashima |

OTHER PUBLICATIONS

Cheng et al., A Security Architecture for the Internet Protocol, IBM System Journal, 1998, pp. 42-60.*

Kent et al., RFC 2401—Security Architecture for the Internet Protocol, Nov. 1998, pp. 8-34.*

Kent et al., RFC 2402—IP Authentication Header, Nov. 1998, pp. 2-15.*

* cited by examiner

| DATA ITEM | ECW2 | ECW1 | CW | SIGNATURE |
|---|---|---|---|---|
| Http://x.abc.com/http/www.abc.com/a.htm | \<SEB> | \<FVB> | F81080 | bd6037a376932e5b0fffb194c6616552afbe7b16 |

| DATA ITEM | ECW1 | CW | SIGNATURE |
|---|---|---|---|
| CUSTOMER=WILE_E_COYOTE | \<SEB> | F81080 | f9bf3b3d4ea3c67e9acb410eeb02fea9d9d56af3 |

TABLE I CONTROL WORD (CW) FIELDS

| FIELD NAME (AND SUB-FIELDS) | LENGTH | VALUES | HEX ENCODING |
|---|---|---|---|
| Marker | 8 bits | 11111000 | F8 |
| Signature Version | 4 bits | 0001 | 1 |
| Key selection | 4 bits | 0000 or 0001 | 0 or 1 |
| Signature Scope | 4 bits | 1000 or 1100 | 8 or C |
| Sign Over UID (1 bit) | | 1 | |
| Sign Over Query (1 bit) | | 0 or 1 | |
| *Reserved* (2 bits; session?) | | 00 | |
| Metadata (each 1 bit flags) | 4 bits | 1000 or 0000 | 0 or 8 |
| HTTP/HTTPS Backend | | 0 or 1 | |
| Form Verification Block (FVB) | | 0 | |
| Signature Expiry Block (SEB) | | 0 | |
| Extended Control Word (ECW) | | 0 | |

*FIG. 4*

TABLE II COOKIE SIGNING EXAMPLE (SET)

| |
|---|
| Set-Cookie:PART_NUMBER=BASS_CLARINET; Domain=extranet.abc.com; Path=/http/www.abc.com , ITEM_PRICE="$237.14" ; Domain=extranet.abc.com; Path=/http/www.abc.com |
| Set-Cookie:PART_NUMBER=BASS_CLARINETF81080f8373a45df3a5bd7275l5406e79ca f83879f127c; Domain=extranet.abc.com; Path=/http/www.abc.com , ITEM_PRICE="$237.14F8108097a7af7c82fff2e3191f1fd63337fcedb121fcfc" ; Domain=extranet.abc.com; Path=/http/www.abc.com |

FIG. 5

TABLE III COOKIE SIGNING EXAMPLE (COOKIE)

| | |
|---|---|
| Cookie: CUSTOMER=WILE_E_COYOTE; $Domain=extranet.abc.com; $Path=/http/www.abc.com PART_NUMBER="ROCKET LAUNCHER 0001"; $Domain=extranet.abc.com; $Path=/http/www.abc.com; SHIPPING = FEDEX; $Domain=extranet.abc.com; $Path=/http/www.abc.com | Cookie: CUSTOMER=WILE_E_COYOTEF8108088fb4548c4146a7aa4baf2a74d46453fb2b44 b54; $Domain=extranet.abc.com; $Path=/http/www.abc.com; PART_NUMBER="ROCKET LAUNCHER 0001F8108063255cbb45dee45e33be2490a5f16575826e4d22"; $Domain=extranet.abc.com; $Path=/http/www.abc.com; SHIPPING = FEDEXF810808bd3f97626b2a90b853f12ecbd0e5408e8df4391; $Domain=extranet.abc.com; $Path=/http/www.abc.com |

FIG. 6

SYSTEMS AND METHODS FOR STATE SIGNING OF INTERNET RESOURCES

CROSS-REFERENCE TO RELATED APPLICATIONS

This patent application claims priority to, and incorporates by reference in its entirety, U.S. patent application Ser. No. 10/857,536, entitled "Method, System and Software for State Signing of Internet Resources", filed May 28, 2004, which claims priority to U.S. Provisional Patent Application No. 60/473,931, entitled "Method, System and Software for State Signing of Internet Resources" and filed May 28, 2003. This patent application incorporates by reference in its entirety each of the following co-pending U.S. patent applications: 1) "Method and System for Identifying Bidirectional Packet Flow" filed on May 28, 2004; 2) "Policy Based Network Address Translation" filed on May 28, 2004; and 3) "Multi-layer Access Control Security System" filed on May 28, 2004.

BACKGROUND

Internet resources, and in particular web applications, are often developed with fields which can be altered or abused by those accessing a resource. However, the resource developer may assume that the resource is unalterable or secret (unpredictable or incapable of being guessed). These fields can include, for example, cookies, hidden inputs on forms and Uniform Resource Locators ("URLs").

Many Internet applications, such as web sites and other corporate resources, can be infiltrated using only a text editor. Exemplary Internet attacks that exploit misplaced trust in client data include cookie tampering, parameter tampering, hidden field manipulation, stealth commanding, forceful browsing, Structured Query Language (SQL) injection, overflow attacks, and others application level attacks.

Current solutions to prevent field tampering exist in the form of software that monitors all traffic going to and from an Internet application. Based on a comprehensive rule set that identifies normal application use, existing products infer session information and analyze all Hypertext Transfer Protocol ("HTTP") packets by putting all packets through a rule engine that represents the web application state machine. A rule set maintained by the rule engine mirrors the complexity of the web application and is derived using either explicit configuration or a "learning mode" which attempts to generate the state machine by observing presumably "correct" behavior.

Existing solutions have significant drawbacks, however, in terms of configuration complexity, scalability, performance and accuracy. Every web site or web application has a different set of rules that must be learned or configured into the system. Changes to the web site may cause the rule set to be rendered invalid and can require reconfiguration or relearning of a new rule set. The complexity of the rules also requires significant CPU capacity and memory to process each web transaction.

For the foregoing reasons, a need exists for a method, system and software for state signing to determine whether fields in a web page or other Internet resource have been altered or abused.

SUMMARY

Before the present methods and systems are described, it is to be understood that this invention is not limited to the particular methodologies and systems described, as these may vary. It is also to be understood that the terminology used in the description is for the purpose of describing the particular versions or embodiments only, and is not intended to limit the scope of the present invention which will be limited only by the appended claims.

It must also be noted that as used herein and in the appended claims, the singular forms "a," "an," and "the" include plural references unless the context clearly dictates otherwise. Thus, for example, reference to a "server" is a reference to one or more servers and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments of the present invention, the preferred methods, materials, and devices are now described. All publications mentioned herein are incorporated by reference. Nothing herein is to be construed as an admission that the invention is not entitled to antedate such disclosure by virtue of prior invention.

In an embodiment, a state signing procedure is used to encode the "state" of the web application into the page delivered to the client. In an embodiment, no server side configuration is required. In an alternate embodiment, the only configuration needed on the device (hardware, software, or combination thereof) implementing the state signing function is to enable or disable the state signing for a particular web site. Because a server requires only minimal configuration, web sites may incorporate the state signing system without otherwise modifying the web site or installing software containing complex rules. In an embodiment, the state signing procedure is implemented when the web server transmits the page (either directly or via a web proxy). Changes in the web application do not affect the state signing procedure because the web page is not signed until it is transmitted.

In an embodiment, state signing is performed by incorporating security metadata in transmissions from a network application server to a client. The security metadata may contain descriptions describing intended network application semantics. The security metadata may indicate how a URL, cookie, data integrity item (used in form field verification) or other network application element is to be used. At some point subsequent to the receipt of the requested network application element, the client transmits a request back to the server. The server may analyze the transmission from the client to determine if it conforms to the intended network application semantics and is safe to use.

Intended network application semantics are descriptions of ways in which information can be returned to the server from the client in a form that does not put the server at risk. Examples of intended network application semantics include: returning cookies to servers without modification by the client; clients following links presented to them by the server; clients not modifying the path portions of Uniform Resource Identifiers ("URIs") before requesting them; clients not modifying queries embedded in the application data; and clients only supplying form data which conforms to the application's expectations or constraints. Constraints that may be used include the length of the data, type of the data, conformance to types of variables or expected values.

In an embodiment, a transmission of the application data from an application server is intercepted, proxied, processed or filtered to identify one or more URLs embedded within the transmissions. A predicted form of a client request containing the one or more URLs is generated, indicating how the URL is expected to be requested in the future, and security metadata containing constraints on the manner in which the client requests the one or more URLs is generated. The application data is combined with the security metadata and transmitted to the client. When the client returns the URI and the security metadata via a request, the URI is validated against the security metadata to ensure that the URI fits within the constraints by which the client may request the URLs.

In an embodiment, a cryptographic signature is applied over the predicted form of the client request containing the one or more URLs previously transmitted by the application server. The client may return the transmission including the security metadata and the cryptographic signature. The cryptographic signature may be verified to ensure that neither the metadata nor the URI have been altered.

In an embodiment, a system is generated in which a subsystem receives resource requests from a client to an application server, and a state signing subsystem signs responses to the resource requests delivered to a client from the application server to indicate authenticity. Each of the system and the subsystem may include one or more of hardware and software.

Enabling/disabling state signing for various data items may be controlled through policies tied to URL prefixes. In an embodiment, individual signatures are accompanied by a control word, embedded into the client side state, and covered by the signature. In an embodiment, the control word includes one or more flags and values which control how the signature is verified when the data item is returned.

BRIEF DESCRIPTION OF THE DRAWINGS

The accompanying drawings, which are incorporated in and form a part of the specification, illustrate embodiments of the present invention and, together with the description serve to explain the principles of the invention.

DETAILED DESCRIPTION

In describing the embodiments of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

Computer program instructions for implementing a software embodiment of the present invention may be stored in a computer program memory or on a computer readable carrier such as a disk, memory stick, portable memory device, communications signal or carrier wave. The steps to complete the methods described herein may be carried out in any computer programming language including object oriented programs including but not limited to Java, C++, Visual Basic, Perl, PHP, and procedural programming languages such as C and Fortran. Other types of programming languages may be utilized, and the invention is not limited to any particular programming language, procedural, object oriented or otherwise.

Computing platforms for implementing the system include but are not limited to microprocessors and associated peripherals such as external Random Access Memory (RAM), Read Only Memory (ROM) and storage devices including but not limited to magnetic drives, optical and magneto-optical drives, removable storage devices including CD-ROMs, removable magnetic cards, or other types of fixed or removable storage devices. Network interfaces are also included in the computing platform in the form of Ethernet cards, adaptors or other components that allow the transmission and reception of data to and from other computers. Multiprocessor systems and network processors, used individually or coupled together, may be utilized. A computing platform may be constructed from elementary components including a microprocessor and associated peripherals, or may be a pre-assembled computer or computing workstation. The system may also be implemented on custom hardware including Application Specific Integrated Circuits (ASICs) or Field Programmable Gate Arrays (FPGAs). In addition, the system can be embodied in an application server as a web server module, servlets, CGI programs or scripts, server side includes, or directly into the web server source code, application source code either dynamically or statically, or into the operating system itself.

Figure 1A:
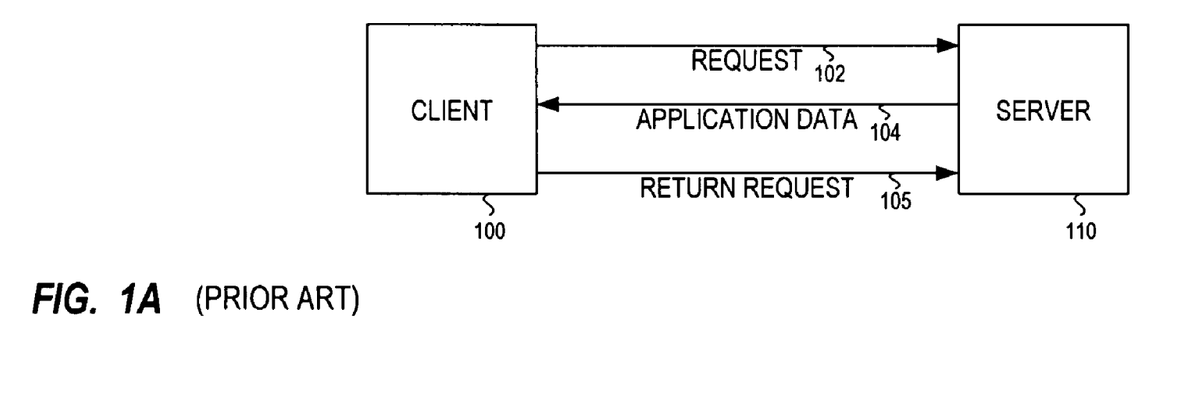
FIGS. 1A and 1B illustrate exemplary direct and indirect client-server requests for application data, respectively, according to embodiments.

FIG. 1A illustrates an exemplary configuration for direct client-server requests according to an embodiment. As shown, a client 100 may issue a request 102 to a server 110. The server 110 may reply to the request 102 with application data 104 and a return request 105, where the return request 105 is triggered by the application data 104. The request 102 may be in the form of a URL containing a HTTP address for a resource such as a web page, a File Transfer Protocol (FTP) command or other instruction requesting data, code or other digital information from the server 110. The server 110 may subsequently return application data 104 to the client 100. The application data 104 may contain the requested data, code or other digital information. The application data 104 may alternately include error messages indicating that the requested information is not available.

Figure 1B:
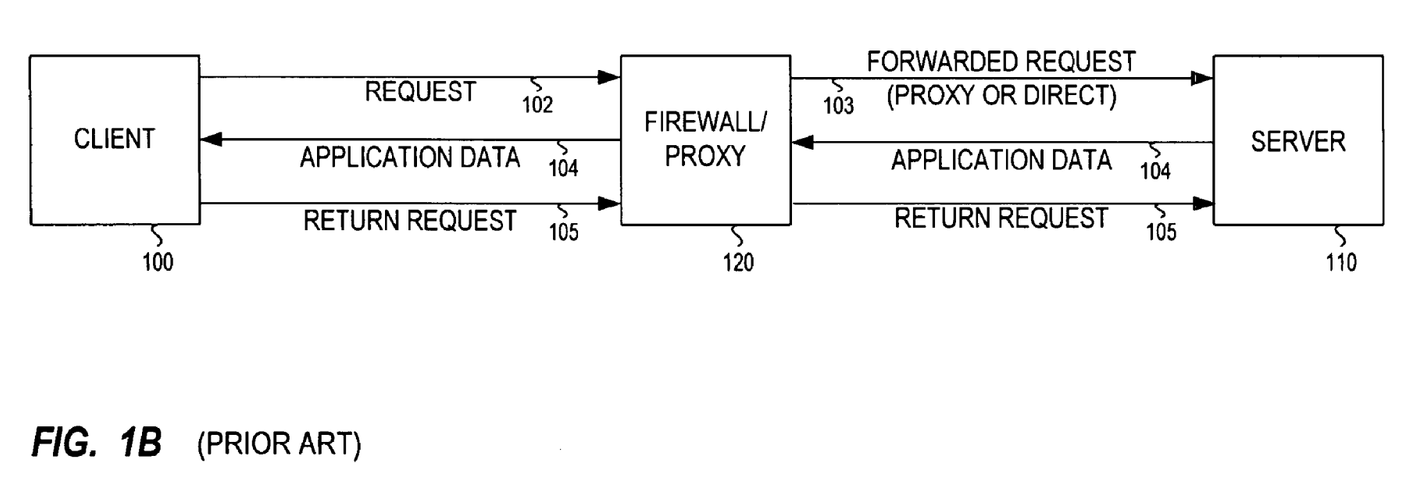

Referring to FIG. 1B, a firewall/proxy 120 may be used between the client 100 and the server 110. When the firewall/proxy 120 is used as a firewall, packets that comprise the request 102 may be examined to determine if they contain requests that could be harmful to the server 110. If it is determined that a request 120 is potentially harmful to the server 110, based on a complex set of rules for inspection of the packets, the request 102 may not be forwarded to the server 110.

When the firewall/proxy 120 is used as a proxy, it may intercept all requests 102 made by the client 100 and determine if those requests are safe for the server 110. If the requests 102 are deemed to be safe, the proxy 120 forwards the request 103 to the server 110 on behalf of the client 100. In both cases, if the request 103 is approved, the application data 104 is returned from the server 110 to the client 100. Subsequent return requests 105 may be subject to the same inspection process to determine if they are safe for the server 110. In all cases, acceptable requests are forwarded to the server 110 without modification. In an embodiment, the firewall/proxy 120 also subjects application data 104 to tests that determine if the application data 104 carries signs of a successful attack. The application data 104 may be dropped if the tests indicate that an attack has been carried out.

Figure 2:
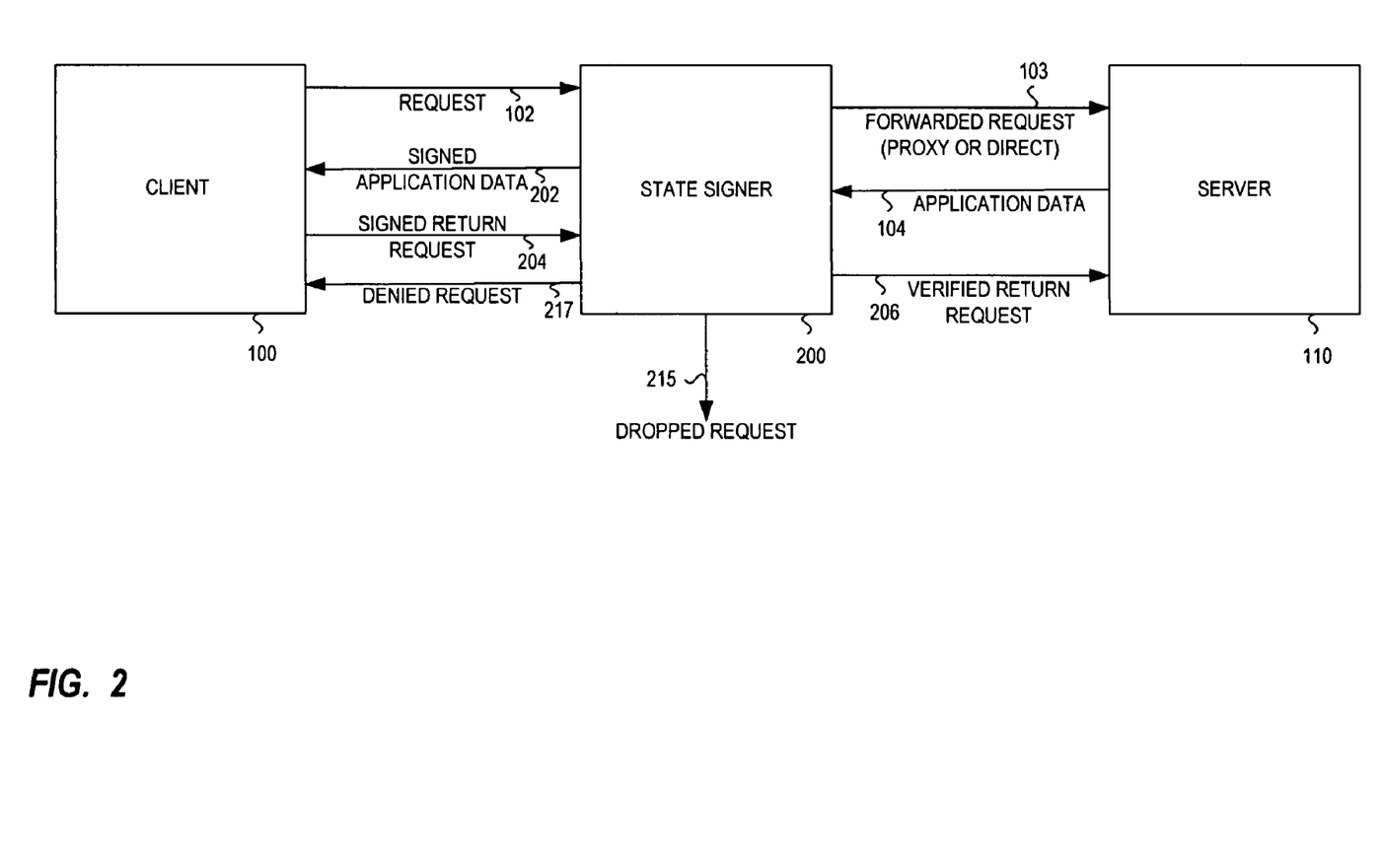
FIG. 2 illustrates an exemplary client-server model using a state signer for application data signing and verification according to an embodiment.

Referring to FIG. 2, the present method, system and software may use a state signer 200 that is placed between the client 100 and the server 110 to receive a request 102 and forward that request 102 to the server 110 as a forwarded request 103. The forwarded request 103 may be a proxy request, with either the state signer 200 or another device acting as the proxy. Upon receiving the forwarded request 103, the server 110 may fulfill the request by sending application data 104 to the state signer 200. The state signer 200 may perform a signing operation that results in signed application data 202 being sent to the client 100. The client 100 may make a signed return request 204 based on the request 102. The state signer 200 may examine the signed return request 204 to determine if the data received by the client 100 has been tampered with. If the data has not been tampered with, a verified return request 206 may be made to the server 110. If the state signer 200 does not verify the signed return request 204, the state signer 200 may, based on its configuration, ignore the request completely, resulting in a dropped request 215, or reply to client 100 with a denied request 217 bearing an error code. In an embodiment, all requests subsequent to the receipt of signed application data 202 are signed return requests, such as signed return request 204. In an alternate embodiment, the state signer 200 is configured to verify only certain requests and to sign only certain application data 104. This discriminatory verification and signing may be accomplished through the use of policies installed into the state signer 200 that select which pieces of application data 104 are signed in the signed application data 202. These policies may be triggered by or based on URI prefixes associated with each application element, user IDs or other policy predicates. The policies may also be used to determine which requests are in the signed return request 204 as opposed to the unsigned return request form of return request 105.

Figure 3A:
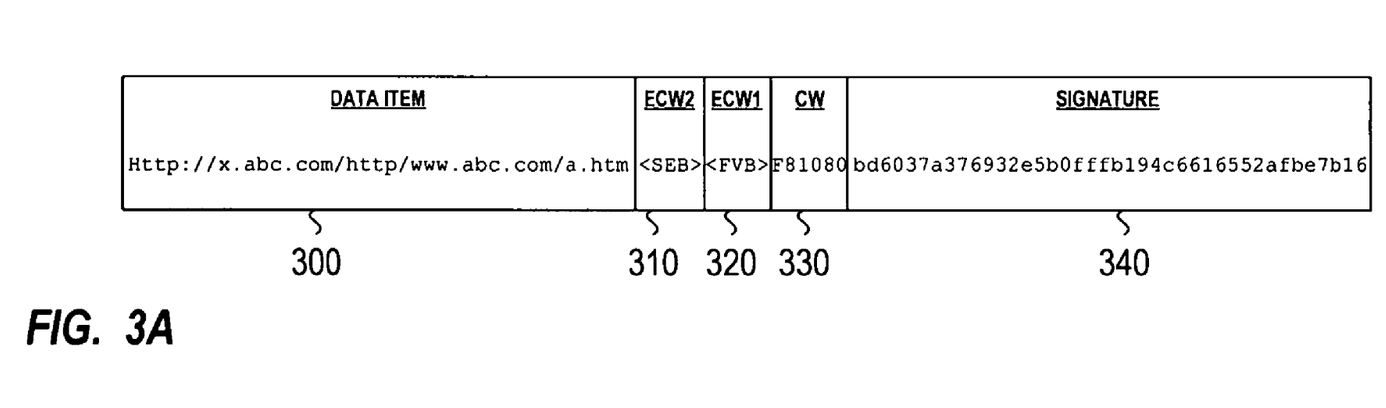
FIGS. 3A and 3B illustrate exemplary signed URLs and cookies, respectively, according to embodiments.

FIG. 3A illustrates a signed URL containing a URL data item 300, a Control Word (CW) 330, an Extended Control Word 1 (ECW1) 320, an Extended Control Word 2 (ECW2) 310, and a signature 340. The URL data item 300 may contain a request for resources. The Control Word 330, the Extended Control Word 1 320, and the Extended Control Word 2 310 may contain metadata indicating one or more aspects of how the URL data item 300 is used. In an embodiment, the URL data item 300 is signed separately from the metadata. In an alternate embodiment, a query field may indicate a portion of the URI corresponding to user-supplied data. The signature 340 may cover this portion of the request if the query was present in the application data 204 when signing took place. Conversely, if the query represents user-supplied data, the signature 340 does not cover the text of the query. In this instance, ECW1 320, for example, may contain a Form Verification Block (FVB) that imposes constraints. The FVB may be covered by the signature 340, may constrain the data that appears in the query and may apply constraints on the data that appears in the body of the request. CW 330 may include information allowing the state signer 200 to determine which portions of the request are covered by the signature 340 (e.g. query signed v. query not signed) and indicating the presence or absence of FVB information. Similarly, the request 300 may also include a fragment identifier that refers to a subsection of the requested resource. Since the fragment is never returned in a subsequent client request, the signature 340 does not cover the text of the fragment identifier.

Figure 3B:
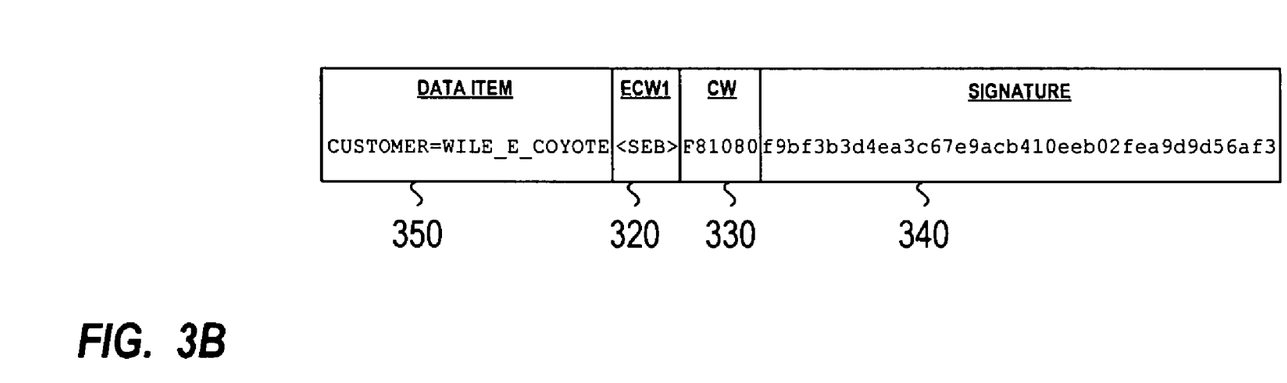

Referring to FIG. 3B, a signed cookie is illustrated in which a cookie data item 350 is combined with metadata, comprising CW 330 and ECW1 320, and the signature 340 to produce a cookie item containing additional information such that the state signer 200 can verify its authenticity and safety.

Figure 5:
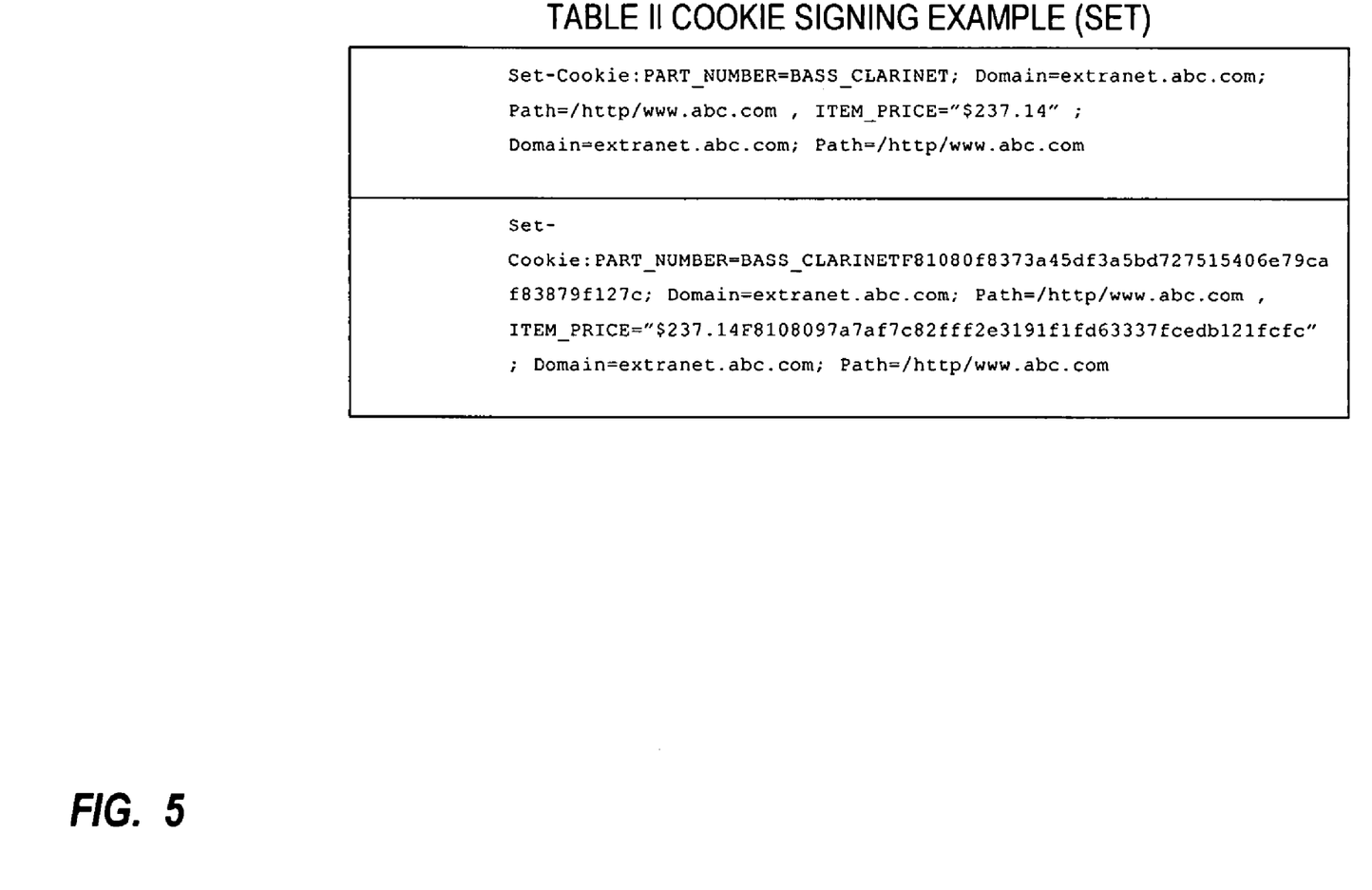
FIG. 5 illustrates an example of cookie signing for a set cookie operation according to an embodiment.
Figure 6:
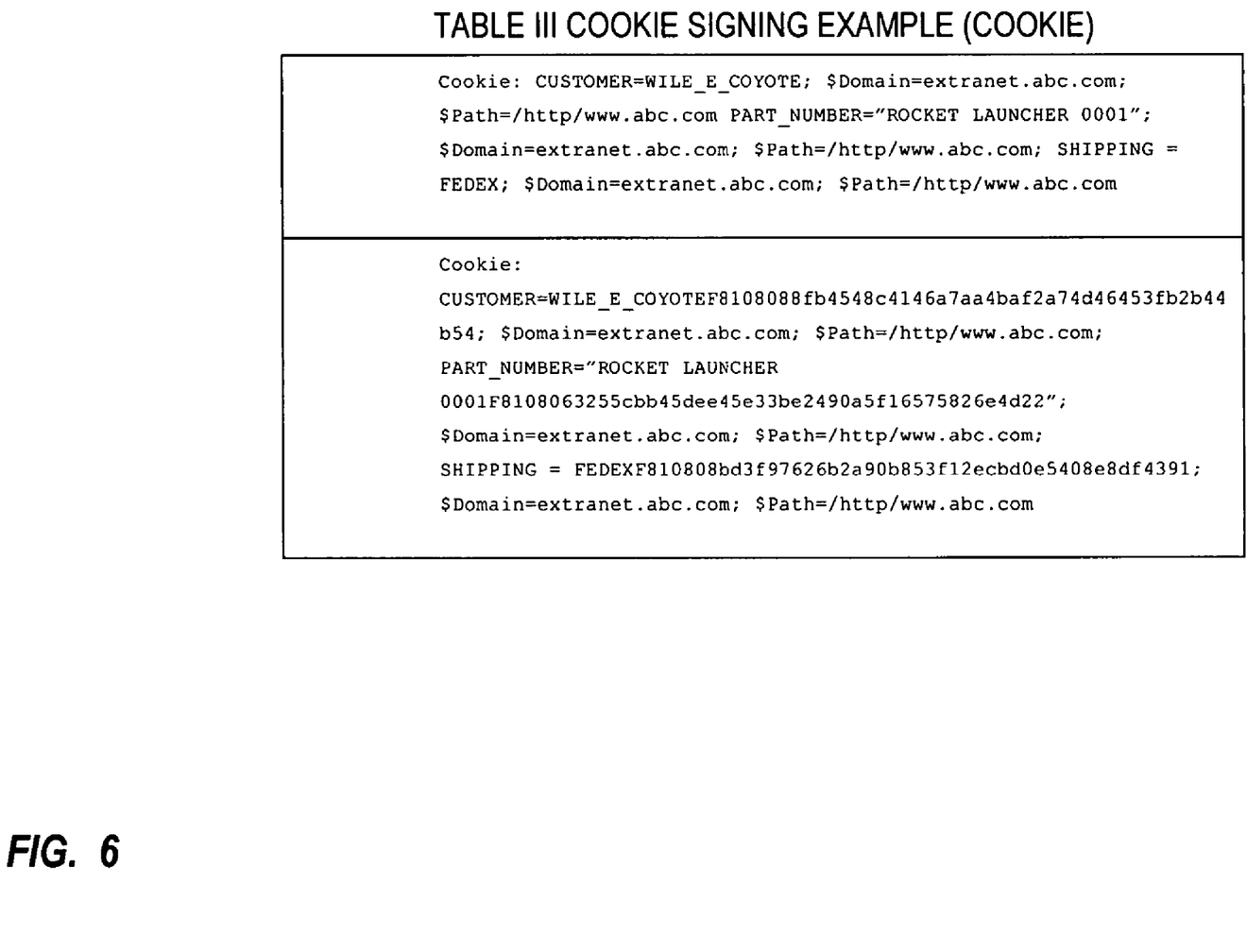
FIG. 6 illustrates an example of cookie signing according to an embodiment.

FIGS. 5 and 6 illustrate cookie-signing examples for a set cookie operation and a return cookie operation, respectively. The upper portion of FIG. 5 illustrates the set cookie header before signing. The lower portion of FIG. 5 represents the set cookie header after signing. In an embodiment, the data items of "PART NUMBER," "BASS_CLARINET," "ITEM_PRICE" and "$237.14" are signed. In an alternate embodiment, the cookie attributes (e.g. path and secure) may be signed. Referring to FIG. 6, the data items of "CUSTOMER," "WILE E COYOTE," "PART NUMBER," "ROCKET LAUNCHER 001," "SHIPPING" AND "FEDEX" in the upper portion of FIG. 6 are signed.

Signatures are generated using keys and the text (data fields, metadata fields, or combinations thereof) to be signed. In an embodiment, the signature of a data item is generated using three inputs: UID, text, and key:

uid: the numeric user ID of the requesting user, expressed as an ASCII-encoded hex value, true integer or other numerical representation.

text: holds all text of the object to be protected, and in this embodiment includes signature metadata. For cookies, the text is the single Name/Value (NV) pair appearing after a "Set-Cookie:" or "Set-Cookie2:" literal, excluding reducible white space. In this embodiment, and as illustrated in FIGS. 5 and 6, each NV pair is signed separately and the header arguments are not signed. For URLs, the text may include the fully resolved URL including the protocol, host and full path.

key: a system-wide randomly generated character string, 20 bytes in length, zero-padded out to 64 bytes.

In an embodiment, a system-wide state signing key, the User ID (UID) associated with the request and the text of the data item (cookie or URL) modified with metadata are concatenated and used as input to a cryptographic signing algorithm. The resulting value from this signing operation may be appended to another permutation of the system-wide state signing key and used as input to the signing algorithm again. In this embodiment, the signature incorporates the identity of the user for whom it was generated in order to prevent the theft of signed elements from caches and cookie files as well as snooping (including proxies such as local proxies, reverse proxies, distributed proxies, corporate proxies, or other proxies).

In an embodiment, signing a data item means performing the following transformation over its text:

$$\text{sign(text,uid,key)} \Rightarrow \text{SHA1\_t(key} \oplus \text{opad} + \text{SHA1\_b(key} \oplus \text{ipad} + \text{uid} + \text{text)}$$

where the following definitions hold:

The plus operator ('+') is meant to indicate string concatenation;

The 0-plus operator ('$\oplus$') is meant to indicate exclusive bitwise OR (XOR) operation;

SHA1_t(text) returns the SHA1 digest of its argument, text, as a hex string (40 characters);

SHA1_b(text) returns the SHA1 digest of its argument, text, as a 20 byte number;

ipad=the byte 0x36 repeated 64 times;

opad=the byte 0x5C repeated 64 times; and key=the encryption key used to generate the secure signature.

This function returns the signature to be appended to the state data.

In addition to the signature itself, a control word may be incorporated into the item's text before signing it. The control word carries information used by the state signer 200 when later verifying the signature. In an embodiment, the control word is expressed as an ASCII-encoded 3-byte hex value (6 characters).

Figure 4:
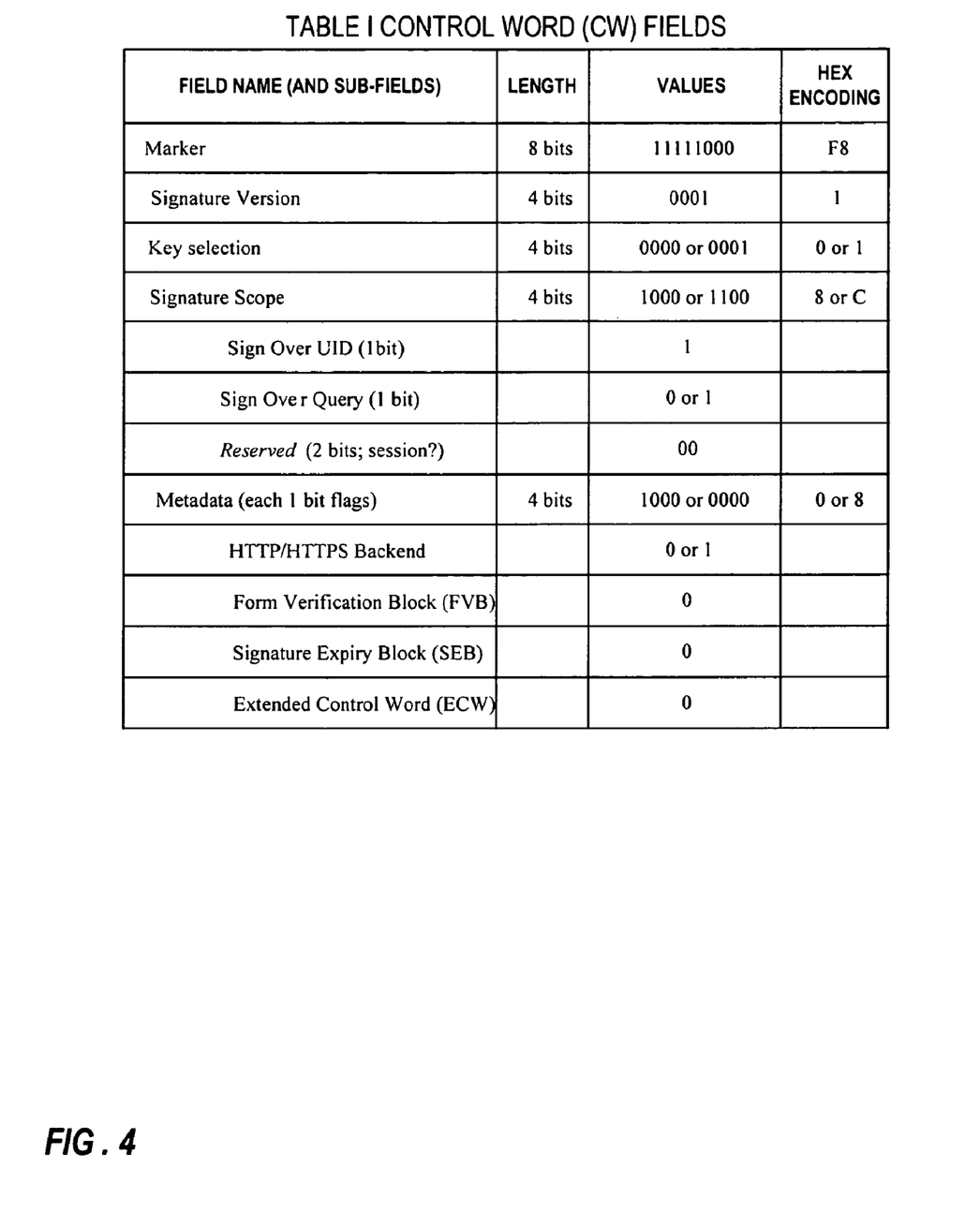
FIG. 4 illustrates an exemplary table of signature metadata according to an embodiment.

FIG. 4 illustrates a table for Control Word 330 content used in one embodiment. CW 330 includes metadata that may indicate the intent of the request, as well as information regarding the signature, how that signature was obtained and a marker facilitating rapid discrimination of signed from unsigned requests.

In an embodiment, CW 330 has the following grammar:

| | |
|---|---|
| CTRLWD = | "F81" KEY QUERY SECURE |
| KEY = | "0" for key 0 or "1" for key 1 |
| QUERY = | "8" for ignore query or "C" for sign query |
| SECURE = | "0" for http backend 0 or "8" for https backend |

In the abovementioned embodiment, eight legal hexadecimal values of CW 330 maybe used: 0xF81080, 0xF81000, 0xF81180, 0xF811 CO, 0xF81088, 0xF810C8, 0xF81188 and 0xF81C8. In an embodiment, CW 330 appears in a predictable location within any signed text, thus the presence of the text "F81" may be used to distinguish signed content from unsigned content. In this embodiment, extra "marker bits" are included in the control word.

ECW1 320 and ECW2 310 may be used for FVBs and Signature Expiry Blocks (SEBs), respectively. SEBs may contain an ASCII-encoded date (e.g. ASN.1) beyond which the signature is considered invalid. Each may be used for other purposes as well and may act as extensions to CW 330.

It is preferable, for security reasons, to update or regenerate the key used for encryption periodically to protect against the possibility of undetected key compromise. In an embodiment, a system-wide key is used rather than per connection, per-application, or per-user keys. In this embodiment, two keys are active in the system at any given time to allow for periodic rotation of the keys. A simple index may be used to track which key is active. In alternate embodiments, a larger number of keys can be used, or the keys can be varied for each connection, application or user. As will be understood by one skilled in the art, a variety of security techniques may be applied for key generation, and public key and/or private key systems may be used.

Changing or rotating keys may result in a broken client-side state resulting in unusable bookmarks, cookies and/or cached web pages. In an embodiment, the key regeneration interval is set to one month to allow for a maximum two-week window of usability for the client-side state. In addition, the system administrator may cause the state signer 200 to return a "301 Permanent Redirect" message for requests using a key that is valid but not current. This redirect may include a URI signed using the current key. This process may permit bookmarks and cache entries to be updated in many types of Internet browsers including INTERNET EXPLORER® browsers produced by Microsoft Corporation. In this embodiment, bookmarks remain current as long as they are requested at least once every key refresh period. In an alternate embodiment, link verifier software is used to verify the link and refresh broken links with data signed by the current key.

In an embodiment, keys are 20 bytes long and are cryptographically random. In this embodiment, the keys are generated by a random number generator, such as the random number generator produced by Cavium Networks. Other embodiments with longer or shorter keys are possible, and as previously mentioned, a number of key generation techniques may be utilized.

In an embodiment, cookie signing can be enabled or disabled. In this embodiment, cookie signing may be controlled on the basis of the URI prefix of the requested URI, as well as the URI prefix of the cookie's PATH attribute. In this embodiment, if cookie signing is disabled on any URI prefix, the setting is not re-enabled on any URL descendant of that prefix.

A cookie may not always bear a PATH attribute. For a cookie without a PATH attribute, the standard protocol may be to default to the request-host for the domain and the path of the request URL that generated the set-cookie response, up to, but not including, the right-most "I." Preferably, all cookie signing operations occur only on the re-written cookie attributes. In this embodiment, cookie signing takes place after the rewrite on the request headers, but before the rewrite on the response headers. When an incoming Cookie:request header or Set-Cookie:response header is received, a prefix table lookup may be performed over the text of its PATH attribute. If cookie signing is enabled, for that PATH, a valid signature must appear on that cookie. If not, the cookie may be passed through unmodified. A management interface may be provided to ensure that if cookie signing is disabled on any particular prefix, other policies bearing that prefix "inherit" that state.

With respect to cookie requests, the process may be initiated by consulting a policy database to determine the state of the cookie signing feature (enabled/disabled) for both signature checking and the subsequent signature generation. In an embodiment, the authenticated user ID of the requestor is also examined.

For cookie bearing requests that need to be verified, a signature may be generated over the user ID and the name value text (plus control word and metadata). The generated signature may be compared to the signature embedded in the returned cookie to determine if the generated signature is indeed verified. If the generated signature is verified, the cookie passes verification. If it is not verified, the cookie, along with its associated attributes, is deleted from the output stream.

For cookie bearing replies, the state of the cookie signing feature associated with the original URI request may be recalled.

In a next step for cookie replies, a scan may be performed at the application layer to detect cookie headers and to return the appropriate fields including the cookie name, value, domain, and path. This step may also be performed on cookie requests.

For identified cookies, a control word may be added. The cookie may then be signed and appropriately inserted into the output stream.

For URL signing, relative URLs may first be resolved to permit signing. Exemplary URLs that need to be resolved may include network-path references, absolute-path references and relative-path references. Although fully resolved URLs are used in signature generation, the output stream may not need to reference the fully resolved URL.

In both cookie and URI signing, the state signer 200 may remove the signature, CW 330 and associated metadata from the requested URI and/or cookie before forwarding it to the application server 110.

Although the invention has been described with reference to the preferred embodiments, it will be apparent to one skilled in the art that variations and modifications are contemplated within the spirit and scope of the invention. The drawings and description of the preferred embodiments are made by way of example rather than to limit the scope of the invention, and it is intended to cover within the spirit and scope of the invention all such changes and modifications.

What is claimed:

1. A method for an intermediary device to provide security between a client and server via state signing of resources controlled by policy, the method comprising the steps of:
    (a) intercepting, by a device between a client and a server, a response from the server to a request of the client, the response comprising a plurality of application data items;
    (b) determining, via a policy, one or more application data items of the plurality of application data items to sign;
    (c) generating, by a state signer responsive to the policy, a signature for each of the determined one or more application data items;
    (d) incorporating, by the state signer, a control word having metadata to control signature verification in each of the one or more signed application data items;
    (e) transmitting, by the device, to the client in response to the request, a modified response having the signed one or more application data items and corresponding control words; and
    (f) receiving, by the device, a second request from the client and verifying the signature of the one or more signed application data items in accordance with the control word.

2. The method of claim 1, wherein step (b) comprises determining, via the policy, the one or more application data items to sign based on Uniform Resource Locator (URL) prefixes associated with each of the plurality of application data items.

3. The method of claim 1, wherein step (b) comprises determining, via the policy, the one or more application data items to sign based on a user identifier associated with one of the request or the response.

4. The method of claim 1, wherein step (b) comprises determining, via the policy, application data items of the plurality of application data items to leave unsigned.

5. The method of claim 1 wherein the control word having metadata indicating one or more of the following: intent of the request, information regarding signature of the signed application data items, how the signature was obtained and a marker to determined signed application data items from unsigned application data items.

6. The method of claim 1, wherein the second request from the client for at least a first application data item of the one or more signed application data items, and verifying the second request has a valid signature for the first application data item.

7. The method of claim 1, wherein step (c) comprises generating, by the state signer, the signature using a user identifier, text of the application data item, and a key.

8. The method of claim 1, wherein step (c) comprises generating, by the state signer, the signature of text of the application data item and a control word corresponding to the signature.

9. The method of claim 1, wherein the device comprises one of a firewall or a proxy.

10. A method for an intermediary device to provide security between a client and server via state signing of resources using a control word to verify signed resources, the method comprising the steps of:
    (a) intercepting, by a device between a client and a server, a response from the server to a request of the client, the response comprising a plurality of application data items;
    (b) incorporating, by a state signer, a control word into one or more application data items of the plurality of application data items, the control word comprising metadata to control verification of a signed application data item;
    (c) generating, by the state signer, a signature for the each of the one or more application data items;
    (d) transmitting, by the device, to the client in response to the request, a modified response having the signed one or more application data items and corresponding control words
    (e) receiving, by the device, a second request from the client and verifying the signature of one or more signed application data items in accordance with the control word.

11. The method of claim 10, wherein step (c) comprises generating, by the state signer, the signature for an application data item including the control word.

12. The method of claim 10, wherein step (b) comprising incorporating, by the state signer, the control word to indicate a marker to use to distinguish between signed content and unsigned content.

13. The method of claim 10, wherein step (b) comprising incorporating, by the state signer, the control word to indicate a date beyond which the signature is considered invalid.

14. The method of claim 10, wherein step (b) comprising incorporating, by the state signer, the control word to indicate a first system key of a plurality system keys to use for one of generating or verifying the signature.

15. The method of claim 10, wherein step (b) comprising incorporating, by the state signer, the control word to indicate whether a query is one of signed or unsigned.

16. The method of claim 10, wherein step (b) comprising incorporating, by the state signer, the control word to indicate whether a backend connection uses a secure HyperText Transfer Protocol.

17. The method of claim 10, wherein step (b) comprising incorporating, by the state signer, the control word to comprise a form verification block to impose constraints on one of data that appears in a query or data that appears in a second request.

18. The method of claim 17, wherein the constraints include one or more of the following: a length of the data, a type of the data, conformance to type of variables, and conformance to expected values.

19. The method of claim 10, wherein step (b) comprising incorporating, by the state signer, one or more extended control words with the control word.

20. The method of claim 10, wherein the device comprises one of a firewall or a proxy.

* * * * *